United States Patent [19]

Aoki et al.

[11] Patent Number: 4,802,966
[45] Date of Patent: Feb. 7, 1989

[54] METHOD FOR TREATING LIQUID USED FOR ABSORBING GASEOUS SULFUR DIOXIDE IN THE PROCESS FOR DESULFURIZATION OF COMBUSTION EXHAUST GAS

[75] Inventors: Haruo Aoki; Yoshihiko Kudo, both of Iwaki, Japan

[73] Assignee: Kureha Kagaku Kogyo Kabushiki Kaisha, Tokyo, Japan

[21] Appl. No.: 39,478

[22] Filed: Apr. 16, 1987

[30] Foreign Application Priority Data

Apr. 17, 1986 [JP] Japan ................... 61-89007

[51] Int. Cl.$^4$ .................... C25B 7/00; C25B 13/00
[52] U.S. Cl. ..................... 204/182.4; 210/638
[58] Field of Search ............... 204/182.4; 210/638, 210/651, 685, 243; 423/242 A

[56] References Cited

U.S. PATENT DOCUMENTS

| | | | |
|---|---|---|---|
| 3,974,258 | 8/1976 | Poitevin et al. | 204/182.4 |
| 4,337,231 | 6/1982 | Yaguchi et al. | 423/243 |
| 4,367,205 | 1/1983 | Kudo et al. | 423/243 |
| 4,636,295 | 1/1987 | Ball et al. | 204/182.4 |

Primary Examiner—Ivars Cintins
Attorney, Agent, or Firm—John P. White

[57] ABSTRACT

Disclosed herein is a method for treating a liquid used for absorbing gaseous sulfur dioxide in the wet process for desulfurization of a combustion exhaust gas of the gypsum-by-producing type, which method comprises the steps of, after subjecting a liquid, which has been saturated with gypsum, has dissolved at least magnesium sulfate and magnesium chloride and is used as the above-mentioned liquid for absorbing gaseous sulfur dioxide, to clarifying treatment, passing the liquid saturated with gypsum through an electrodialyzer having three dialyzing chambers comprising one sheet of cation-exchange membrane and two sheets of membrane selectively permeable to monovalent anions as one unit, thereby selectively separating and removing the chloride ion in the above-mentioned liquid as an aqueous solution of magnesium chloride of a high concentration.

9 Claims, 1 Drawing Sheet

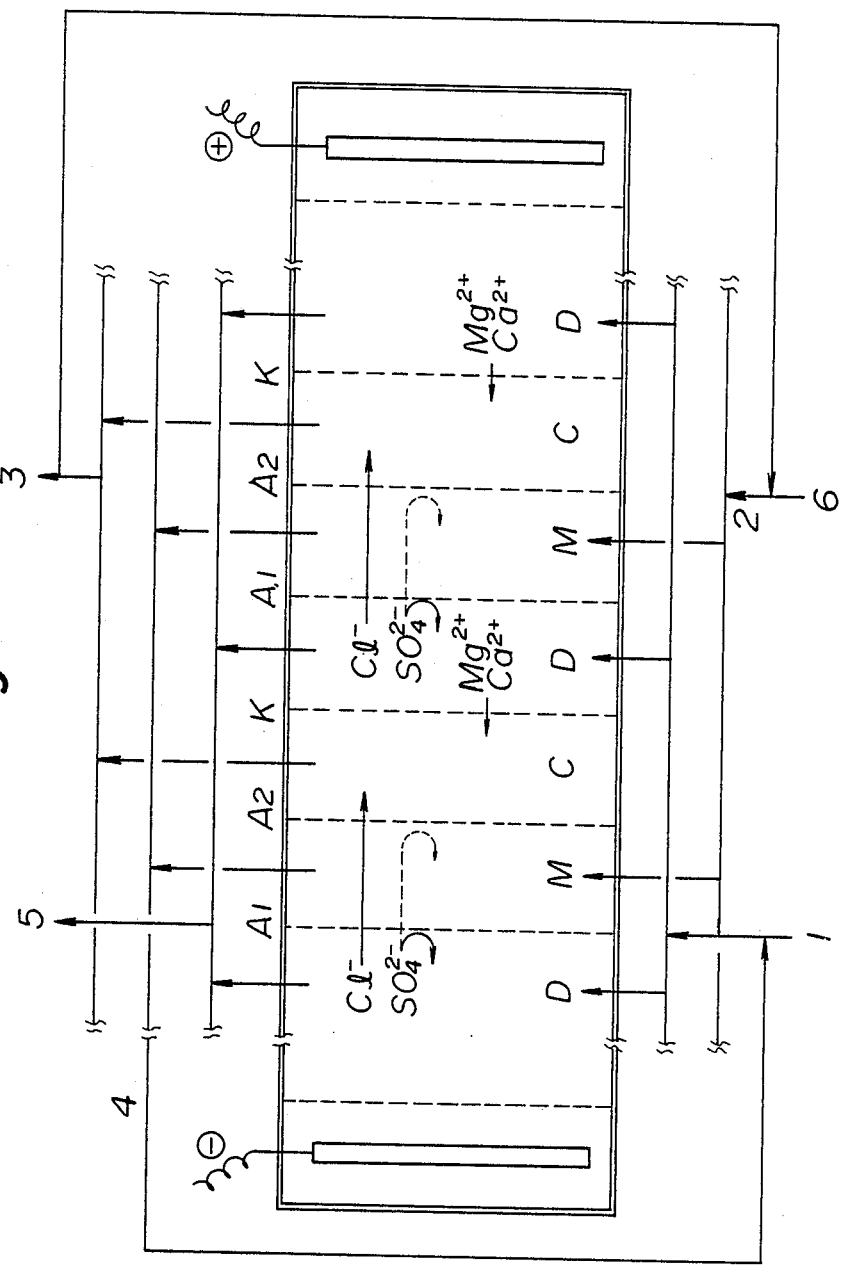

1

METHOD FOR TREATING LIQUID USED FOR ABSORBING GASEOUS SULFUR DIOXIDE IN THE PROCESS FOR DESULFURIZATION OF COMBUSTION EXHAUST GAS

BACKGROUND OF THE INVENTION

The present invention relates to a method for treating a liquid used for absorbing gaseous sulfur dioxide in the wet process for desulfurization of a combustion exhaust gas of the gypsum-by-producing type, and more in detail, the present invention relates to a method for removing chloride ions, which accumulate in the above-mentioned liquid used for absorbing gaseous sulfur dioxide, therefrom by the above-mentioned treatment.

Hitherto, the wet process for desulfurization of a combustion exhaust gas of the gypsum-by-producing type has been broadly carried out, wherein gaseous sulfur dioxide (hereinafter referred to as $SO_2$) contained in a combustion exhaust gas, etc. is removed therefrom by a wet process, the thus absorbed $So_2$ is neutralized with limestone or slaked lime, and by air-oxidizing the formed sulfite the gypsum is by-produced.

Usually, in the above-mentioned process for desulfurization, in order to prevent the scaling of gypsum and to improve the absorbability of $SO_2$, a water-soluble sulfate is made coexistent in the liquid used for absorbing $SO_2$, and as such a water-soluble sulfate, magnesium sulfate is usually used, because magnesium is contained in limestone. stone.

Furthermore, in the above-mentioned process for desulfurization, a carboxylic acid is added to the liquid used for absorbing $SO_2$, thereby attempting the large improvement of $SO_2$-absorbability and the improvement of the reaction velocity between $SO_2$ and limestone while utilizing the pH-buffer action of the carboxylic acid. At that time, a major part of the thus added carboxylic acid is present as carboxylate ions in the liquid used for absorbing $SO_2$ (hereinafter referred to as the $SO_2$-absorbing liquid) and almost all the cations in the $SO_2$-absorbing liquid are $Mg^{2+}$ derived from the limestone. Accordingly, the above-mentioned addition of a carboxylic acid is understood to make a magnesium carboxylate coexistent in the $SO_2$-absorbing liquid. As the above-mentioned carboxylic acid, succinic acid, glutaric, acid, adipic acid, fumaric acid, maleic acid, sulfosuccinic acid, etc. have been proposed.

Now, in the process for desulfurization of a combustion exhaust gas of the gypsum-by-producing type, a liquid which has been saturated by gypsum and has dissolved the above-mentioned components is used in circulation for absorption of $SO_2$, and at that time, since gaseous hydrogen chloride which is contained in the combustion exhaust gas of coal, etc. is absorbed by the $SO_2$-absorbing liquid together with $SO_2$, the thus absorbed chloride ions accumulate as magnesium chloride in the $SO_2$-absorbing liquid. Furthermore, the chlorides contained in the supply water which is supplied for the system of the above-mentioned process also become the origin of the accumulation of the chloride ion (hereinafter referred to as $Cl^-$). Such as accumulation of $Cl^-$ is particularly remarkable in the case of using the $SO_2$-absorbing column of single scrubber (absorber) type not provided with a cooling column.

And, since the presence of $Cl^-$ of a high concentration in the $SO_2$-absorbing liquid becomes the origin of the corrosion of the apparatus of the system, it is necessary to remove $Cl^-$, which accumulates in the circulated $SO_2$-absorbing liquid, therefrom.

Hitherto, as the method for removing $Cl^-$ accumulating in the $SO_2$-absorbing liquid therefrom, a method of discharging a part of the $SO_2$-absorbing liquid as a waste liquor from the system has been carried out. However, according to such a method, the above-mentioned magnesium sulfate and the magnesium carboxylate, which are useful components, are lost together with magnesium chloride from the $SO_2$-absorbing liquid. Accordingly, such a method is inadvisable.

In addition, according to the above-mentioned method, a $SO_2$-absorbing liquid of relatively low in concentration of $Cl^-$, for instance, from 1 to 2% by weight, is discharged from the system, and the volume of the discharged liquid becomes large. Accordingly, the method is also economically unprofitable.

As another method for preventing the accumulation of $Cl^-$ in the $SO_2$-absorbing liquid, a method of electro dialysis while using an ion-exchange membrane has been known. This electrodialytic method by the use of the ion-exchange membrane is adopted as the concentration of sea water for a long time, and in the case of sea water, although $Na^+$ and $Cl^-$ are the main components thereof, since $Ca^{2+}$ and $SO_4^{2-}$ are coexistent therewith, in the case of condensing such sea water, gypsum which is relatively low in solubility is deposited.

Accordingly, the scale-trouble due to gypsum is prevented by using a membrane selectively permeable to monovalent ions as the cation-exchange membrane and the anion-exchange membrane, respectively.

However, since the filtrate of the $SO_2$-absorbing liquid in the above-mentioned process for desulfurization has been saturated with gypsum premeditatedly, the deposition of gypsum is apt to occur, and moreover, since as the cation in the filtrate of the $SO_2$-absorbing liquid, $Mg^{2+}$ which is an impurity of limestone is present in larger amount than monovalent cations, it is impossible to use a membrane selectively permeable to monovalent ions, in contrast with the case of electrodialysis of sea water.

Accordingly, in the filtrate of the $SO_2$-absorbing liquid, $Ca^{2+}$ becomes much present in the concentrate of the electrodilytic cell to generate the gypsum scale on the ion-exchange membrane or within the membrane at the time of operation of electrodialysis. Namely, such a phenomenon makes the continuation of the operation of electrodialysis difficult. This is a large problem.

Furthermore, the application of the electrodialytic method to removal of $Cl^-$ from the liquid which has been saturated with gypsum has already been proposed, and among such methods, there has been effected a device for prevention of the scale-trouble due to gypsum.

For instance, in Japanese Patent Application Laying-Open (KOKAI) No. 55-81782/1980, the salts in the $SO_2$-absorbing liquid are divided into (1) the salts of monovalent cation - divalent anion series and (2) the salts of divalent cation - monovalent anion series by using an electrodialyzer having four dialyzing chambers comprising a usual pair of an anion-exchange membrane and a cation-exchange membrane combined with a pair of a membrane selectively permeable to monovalent anions and a membrane selectively permeable to monovalent cations as one unit.

However, since only the equivalent amount of $Cl^-$ to the amount of the monovalent cation can be removed by the above-mentioned method, such a method cannot be applied to removal of Cl⁻ from the filtrate of the SO₂-absorbing liquid in the process for desulfurization of a combustion exhaust gas, in which $Mg^{2+}$ is usually present in a large amount as the cation.

Furthermore, the deposition of gypsum is prevented by adjusting the pH of the SO₂-absorbing liquid to not higher than 4.5 (refer to Japanese Patent Application Laying-Open (KOKAI) No. 50-66481/1975) or by using a specified anion-exchange membrane (refer to Japanese Patent Application Laying-Open No. 53-123555/1978). However, any satisfactory result has not been obtained in the point of preventing the generation of the scale of gypsum by the above-mentioned methods.

As a result of the present inventors' studies for solving the problems of the above-mentioned publicly known methods for treating the SO₂-absorbing liquid, it has been found by the present inventors that in the wet process for desulfurization of a combustion exhaust gas of the gypsum-by-producing type, when an aqueous liquid which has been saturated with gypsum and has disolved at least magnesium sulfate and magnesium chloride is used as the SO₂-absorbing liquid and such an aqueous liquid is passed through an electrodialyzer having three dialyzing chambers comprising one sheet of cation-exchange membrane and two sheets of membrane selectively permeable to monovalent anions as one unit, the chloride ions (Cl⁻) accumulated in the above-mentioned circulated SO₂-absorbing liquid can be advantageously separated therefrom and at the same time, gypsum is not deposited on the ion-exchange membrane at the time of separating Cl⁻, and on the basis of the above-mentioned findings, the present inventors have accomplished the present invention.

Namely, the first object of the present invention is to provide a method for treating a SO₂-absorbing liquid in the wet process for desulfurization of a combustion exhaust gas of the gypsum-by-producing type, the method comprising selectively separating and removing Cl⁻ as an aqueous solution of magnesium chloride of a high concentration from the SO₂-absorbing liquid which has been saturated with gypsum.

In the next place, the second object of the present invention is to provide a method for treating the above-mentioned SO₂-absorbing liquid without being accompanied by the deposition of gypsum in the above-mentioned wet process for desulfurization of a combustion exhaust gas of the gypsum-by-producing type.

SUMMARY OF THE INVENTION

In an aspect of the present invention, there is provided a method for treating a SO₂-absorbing liquid in the wet process for desulfurization of a combustion exhaust gas of the gypsum-by-producing type, which method comprises the steps of, after subjecting a liquid which has been saturated with gypsum, has dissolved at least magnesium sulfate and magnesium chloride and is used as the SO₂-absorbing liquid, to clarifying treatment, passing the above-mentioned liquid saturated with gypsum through an electrodialyzer having three dialyzing chambers comprising one sheet of cation-exchange membrane and two sheets of membrane selectively permeable to monovalent anions as one unit, thereby selectively separating and removing Cl⁻ in the above-mentioned liquid as an aqueous solution of magnesium chloride of a high concentration.

BRIEF EXPLANATION OF THE DRAWING

The attached drawing is an exemplification of the outline of the construction of the electrodialyzer used in according to the present invention.

DETAILED DESCRIPTION OF THE INVENTION

The characteristic feature of the present invention lies in, in the wet process for desulfurization of a combustion exhaust gas of the gypsum-by-producing type, the steps of after subjecting the above-mentioned liquid saturated with gypsum to clarifying treatment, passing the thus treated liquid saturated with gypsum through an electrodialyzer having three dialyzing chambers comprising one sheet of cation-exchange membrane and two sheets of membrane selectively permeable to monovalent anions as one unit, thereby selectively separating and removing the chloride ion (Cl⁻) contained in the above-mentioned liquid therefrom as an aqueous solution of magnesium chloride of a high concentration.

The "wet process for desulfurization of a combustion exhaust gas of the gypsum-by-producing type" herein mentioned means a process for desulfurization comprising the steps of neutralizing SO₂ contained in the combustion exhaust gas, etc. by limestone or slaked lime and at the same time, converting the formed sulfite into gypsum by air-oxidation as in the so-called lime-gypsum process, the organic acid-gypsum process and the like.

According to the present invention, in the wet process for desulfurization of a combustion exhaust gas of the gypsum-by-producing type, a liquid which has been saturated with gypsum, has dissolved at least magnesium sulfate and magnesium chloride and is used as the SO₂-absorbing liquid is passed through the electrodialyzer having the above-mentioned three electrodialyzing chambers as one unit in the following manner.

Namely, in the first place, the above-mentioned liquid saturated with gypsum is clarified by a means of centrifugal separation or filtration in order to remove crystalline gypsum and other solid matters contained in the above-mentioned liquid saturated with gypsum to an extent of concentration which does not hinder the operation of passing the liquid through the electrodialyzer, preferably to not more than 1 mg/liter.

The liquid saturated with gypsum, which has been clarified as mentioned above is introduced into the following electrodialyzer.

The electrodialyzer used in the present invention and its function will be explained as follows while referring to the attached figure.

As will be seen in the attached figure, each unit of the three dialyzing chambers of the electrodialyzer according to the present invention has (1) an intermediate chamber M located between two sheets of membranes $A_1$ and $A_2$ selectively permeable to monovalent anions, (2) a concentrating chamber C located between the above-mentioned membrane $A_2$ selectively permeable to monovalent anions and a cation-exchange membrane K and (3) a desalting chamber D located between the above-mentioned cation-exchange membrane K and a sheet of membrane $A_1$ selectively permeable to monovalent anions of the neighboring unit of three dialyzing chambers.

In the attached figure, a line 1 shows the line for introducing the liquid for absorbing gaseous sulfur dioxide (the SO₂-absorbing liquid); a line 2 shows the supply line of supply aqueous solution; a line 3 shows the discharge line of the concentrated liquid; a line 4 shows the discharge line of a liquid from the intermediate chamber M; a line 5 shows the take-out line of the $SO_2$-absorbing liquid after the treatment of electrodialysis and a line 6 shows the line for introducing diluting water.

Into the each desalting chamber D, the above-mentioned clarified liquid which has been obtained from the system of the process for desulfurization and saturated with gyssum is introduced and is desalted therein. The chloride ions ($Cl^-$) in the thus treated liquid pass through the above-mentioned membranes $A_1$ and $A_2$ and are collected in the concentrating chamber C.

Although the membrane $A_1$ is selectively permeable to the monovalent anions, the permeation of a small amount of $SO_4^{2-}$ through the membrane $A_1$ cannot be avoided, and accordingly, some quantity of $SO_4^{2-}$ becomes present in the intermediate chamber M. However, due to the further presence of the membrane $A_2$, $SO_4^{2-}$ is present in the concentrating chamber C at an extremely low concentration, and accordingly, the anions in the concentrating chamber C almost consist of $Cl^-$.

Furthermore, the cations in the above-mentioned, clarified liquid saturated with gypsum, which has been introduced into the each desalting chamber D, pass through the cation-exchange-membrane K and moves to the concentrating chamber C, however, the cations scarcely pass through the membrane $A_2$. Accordingly in the intermediate chamber M, $SO_4^{2-}$ and $Ca^{2+}$ are respectively present only in a low concentration, and there is no fear of the deposition of gypsum in the intermediate chamber M. On the other hand, since the concentration of $Ca^{2+}$ is high, however, the concentration of $SO_4^{2-}$ is extremely low in the concentrating chamber C, there is no fear of the deposition of gypsum in the concentrating chamber C.

Still more, since the concentration of $SO_4^{2-}$ is high in the desalting chamber D and low in the intermediate chamber M, a larger amount of $SO_4^{2-}$ permeate through the membrane $A_1$ than through the membrane $A_2$, and as a result, the permeation of $Cl^-$ through the membrane $A_1$ becomes smaller correspondingly. Accordingly, the concentration of $SO_4^{2-}$ in the intermediate chamber M is raised and on the other hand, the concentration of $Cl^-$ *in the intermediate chamber M is lowered.*

In order to avoid the occurrence of such a phenomenon, the intermediate chamber M is supplied with an aqueous solution containing $Cl^-$, such as an aqueous solution of $MgCl_2$, etc., thereby carrying out the dilution of $SO_4^{2-}$ and the supply of $Cl^-$. The cation in the above-mentioned supply aqueous solution (the aqueous solution containing $Cl^-$) may be any one which does not deposit a sulfate salt by the reaction with $SO_4^{2-}$, and for that purpose, for instance, $Mg^{2+}$, $Na^+$, etc. except for $Ca^{2+}$ are used. However, $Mg^{2+}$ is preferably used in the supply solution, because $MgCl_2$ is the main component in the liquid in the concentrating chamber C. Further, the amount of the supply aqueous solution is preferably as small as possible within the range wherein the concentration of $SO_4^{2-}$ (equivalent/liter) is not over the concentration of $Cl^-$ (equivalent/liter) in the intermediate chamber M.

In the above-mentioned case, when the amount of the supply aqueous solution from the line 2 is over the above-mentioned range, the efficiency of removal of $Cl^-$ becomes poor, and on the other hand, when the amount of the supply aqueous solution is too small, the concentration of $SO_4^{2-}$ in the intermediate chamber M becomes too high resulting in the fear of the deposition of gypsum. Accordingly, it is necessary to pay attention to the amount of the supply aqueous solution.

Usually, in the state of continuous operation, it is preferable to partly collect from 3 to 8% by weight of the concentrated liquid of magnesium chloride taken out from the concentrating chamber C and dilute the thus collected concentrated liquid with diluting water introduced from the line 6 and to use the thus formed diluted liquid as the supply aqueous solution. Furthermore, in this case, the separately prepared aqueous solution of a chloride may be used of course.

The removal of $Cl^-$ from the liquid saturated with gypsum in the wet process for desulfurization of a combustion exhaust gas of the gypsum-by-producing type can be carried out advantageously by the above-mentioned method, however, in the case of carrying out industrially the method according to the present invention, a part of filtrate separated from gypsum, branched off from the system of the wet process for desulfurization of the gypsum-by-producing type, is introduced into the electrodialyzer having the three dialyzing chambers and is passed through it while following the above-mentioned program. The amount of the $SO_2$-absorbing liquid branched off from the system, which is to be introduced into the electrodialyzing chamber is decided corresponding to the amount of $Cl^-$ accumulating in the $SO_2$-absorbing liquid.

The steps of treatment of the above-mentioned $SO_2$-absorbing liquid will be explained while referring to the attached figure as follows.

The $SO_2$-absorbing liquid branched off from the system of the process for desulfurization is introduced into the desalting chamber D of the electrodialyzer from the line 1 and after being treated as above, is taken out from the above-mentioned dialyzer via the line 5 and then is circulated into the system of the process for desulfurization again. The liquid of the line 4 discharged from the intermediate chamber M is returned to the line 1 and then introduced into the desalting chamber D. The concentrated liquid of $Cl^-$ in the concentrating chamber C is discharged from the line 3 and is treated as the waste liquor.

Furthermore, there are cases where $Na^+$ from the service water and the like, $NH_4^+$ derived from the exhausted gas, etc. are contained as cations other than $Mg^{2+}$ in the $SO_2$-absorbing liquid which is subjected to dialytic treatment, and since these monovalent cations pass through the cation-exchange membrane K, there may be cases where the thus separated aqueous solution of magnesium chloride of a high concentration contains some amounts of sodium chloride and ammonium chloride.

Still more, also in the case where the liquid saturated with gypsum, which is introduced into the line 1, contains a magnesium carboxylate, there is no difficulty in the treating method according to the present invention, and as the carboxylic acid, succinic acid, glutaric acid, adipic acid, fumaric acid, maleic acid and sulfosuccinic acid may be mentioned.

Of these carboxylic acids, the use of sulfosuccinic acid or adipic acid is preferable.

In the present invention, by the use of such a carboxylic acid, it is possible to devise the improvement of $SO_2$-absorbability of the $SO_2$-absorbing liquid and the improvement of the reaction velocity with limestone.

The present invention will be explained more concretely while referring to the following non-limitative examples.

EXAMPLE 1

As the liquid specimen for the electrodialyzing test, a model $SO_2$-absorbing liquid of the following composition was used.

The composition of the liquid specimen of the $SO_2$-absorbing liquid:

| | |
|---|---|
| $Cl^-$ | 0.293 N |
| $SO_4^{2-}$ | 1.083 N |
| $Mg^{2+}$ | 1.344 N |
| $Ca^{2+}$ | 0.032 N |
| pH | 6.8 |

For the electrodialysis, an electrodialyzer (made by ASAHI-KASEI KOGYO Co., Ltd., type of SV-7, of the membrane area of 0.5 dm$^2$, the units number of 15 and the circulating flow rate of 1.5 liter/min.) was used, and per one unit, one sheet of the cation-exchange membrane (made by ASAHI-KASEI KOGYO Co., Ltd., under the registered trade name of ACIPLEX K-101) and two sheets of membrane selectively permeable to monovalent anions (made by ASAHIKASEI KOGYO Co., Ltd., under the registered trade name of ACIPLEX A-202) were assembled to be the three dialyzing chambers shown in the attached figure and the thus assembled units were used.

Into the desalting chamber D of the above-mentioned electrodialyzer, the above-mentioned model $SO_2$-absorbing liquid was introduced so that the concentration of $Cl^-$ in the above-mentioned chamber D became 0.15 N, and while partly collecting 4% by weight of the concentrated liquid taken out from the concentrating chamber C and diluting the collected concentrated liquid with water so that the concentration of $Cl^-$ thereof became 1N, the intermediated chamber M is supplied with the thus diluted liquid. Thus, under the above condition, the removal of $Cl^-$ was continuously carried out for one month at a current density of 3 A/dm$^2$.

The results are shown in Table 1.

TABLE 1

| Generation of gypsum scale | | none |
|---|---|---|
| Change of voltage and current efficiency with the passage of time | | none |
| Composition of the concentrated liquid | $Cl^-$ | 3.31 N |
| | $SO_4^{2-}$ | 0.007 N |
| | $Ca^{2+}$ | 0.07 N |
| | $Mg^{2+}$ | 3.23 N |

EXAMPLE 2

As the liquid saturated with gypsum, to be treated in Example 2, the model $SO_2$-absorbing liquid of the following composition corresponding to the circulating liquid after separating the by-produced gypsum in the process for desulfurization of a combustion exhaust gas of the sulfosuccinic acid-gypsum type (refer to, for instance, U.S. Pat. No. 4,578,257, concerned in this process for desulfurization) was used.

| The composition of the model $SO_2$-absorbing liquid: | |
|---|---|
| $Cl^-$ | 0.305 N |
| $SO_4^{2-}$ | 1.142 N |
| sulfosuccinate anion | 0.128 N |
| $Mg^{2+}$ | 1.405 N |
| $Ca^{2+}$ | 0.035 N |
| $Na^+$ | 0.135 N |
| pH | 6.0 |

The treatment of the above-mentioned model $SO_2$-absorbing liquid was repeatedly carried out in the same manner as in Example 1 while using the same electrodialyzer as in Example 1. The results are shown in Table 2.

TABLE 2

| Generation of gypsum scale | | none |
|---|---|---|
| Change of voltage and current efficiency with the passage of time | | none |
| Composition of the concentrated liquid | $Cl^-$ | 3.30 N |
| | $SO_4^{2-}$ | 0.007 N |
| | sulfosuccinate anion | 0.001 N |
| | $Mg^{2+}$ | 2.93 N |
| | $Ca^{2+}$ | 0.07 N |
| | $Na^+$ | 0.30 N |

COMPARATIVE EXAMPLE

The present Comparative Example shows the result of the treatment of the model $SO_2$-absorbing liquid of the same composition as in Example 2 while using an electrodialyzer consisting of two dialyzing chambers.

That is, an electrodialyzer (made by ASAHI-KASEI KOGYO Co., Ltd., MOdel SV-7) provided with oen sheet of cation-exchange membrane (ACIPLEX® K-101) and one sheet of membrane selectively permeable to monovalent anions (ACIPLEX® A-202) was used.

Into the desalting chamber of the above-mentioned electrodialyzer, the above-mentioned model $SO_2$-absorbing liquid was introduced so that the concentration of $Cl^-$ became 0.15 N in the chamber and the apparatus was continuously operated for a week in the respective two cases of the current densities of 1 A/dm$^2$ and 3 A/dm$^2$.

The results are shown in Table 3.

In the above electrodialyzer, $P_{Cl^-\_SO_4^{2-}}$ (selective permeation coefficient of $SO_4^{2-}$ to $Cl^-$) of the membrane selectively permeable to monovalent anions (ACIPLEX® A-202) was 0.003 when the current density was 1 A/dm$^2$ and 0.002 when it was 3 A/dm$^2$.

TABLE 3

| Current density (A/dm$^2$) | Ratio of area of the membrane on which gypsum deposited (%) | Composition of the liquid in the concentrating chamber (N) | | | | | |
|---|---|---|---|---|---|---|---|
| | | $Cl^-$ | $SO_4^{2-}$ | sulfosuccinate anion | $Mg^{2+}$ | $Ca^{2+}$ | $Na^+$ |
| 1 | 1 | 2.5 | 0.05 | 0.016 | 2.31 | 0.06 | 0.19 |
| 3 | 2 | 3.1 | 0.05 | 0.012 | 2.80 | 0.07 | 0.28 |

EXAMPLE 3

The present Example shows the results of treatment of an $SO_2$-absorbing liquid obtained by actually carrying out the desulfurization while using a desulfurizing apparatus of a combustion exhaust gas of the sulfosuccinic acid-gypsum type. Namely, $SO_2$ was absorbed by the liquid resulting in forming $SO_3^{2-}$ therein and after air-oxidizing the $SO_3^{2-}$ to $SO_4^{2-}$, the liquid containing the thus formed $SO_4^{2-}$ was filtered with a filter paper of No. -5A and used as a test liquid.

The composition of the test liquid is shown below: (unit: mg/liter)

| | |
|---|---|
| $Cl^-$ | 8900 |
| $SO_4^{2-}$ | 39000 |
| total organic carbon | 3490 |
| $Mg^{2+}$ | 12100 |
| $Ca^{2+}$ | 980 |
| $Na^+$ | 3700 |
| Ni | 140 |
| V | 18 |
| Fe | 2.4 |
| pH | 5.8 |

The above-mentioned $SO_2$-absorbing liquid was treated by using the same electrodialyzer as in Example 1. That is, into the desalting chamber D of the above-mentioned electrodialyzer, the above-mentioned model $SO_2$-absorbing liquid was introduced so that the concentration of $Cl^-$ in the above-mentioned chamber D became 0.15 N, and while partly collecting 5% by weight of the concentrated liquid taken out from the concentrating chamber C and diluting the collected concentrated liquid with water so that the concentration of $Cl^-$ thereof became 1N, the intermediated chamber M is supplied with the thus diluted liquid. Thus, under the above condition, the removal of $Cl^-$ was continuously carried out for one month at a current density of 2 $A/dm^2$.

The results are shown in Table 4.

TABLE 4

| | | |
|---|---|---|
| Generation of gypsum scale | | none |
| Deposition of heavy metal on the membrane | | none |
| Composition of the concentrated liquid (mg/liter) | $Cl^-$ | 105000 |
| | $SO_4^{2-}$ | 340 |
| | total organic carbon | 77 |
| | $Mg^{2+}$ | 29000 |
| | $Ca^{2+}$ | 3200 |
| | $Na^+$ | 9700 |
| | Ni | 280 |
| | V | 0.7 |
| | Fe | 2.3 |

EFFECT OF THE INVENTION

As are shown in the above-mentioned Examples, the removal of chloride ions ($Cl^-$) accumulating in the liquid saturated with gypsum, which is used as the $SO_2$-absorbing liquid in the wet process for desulfurization of a combustion exhaust gas of the gypsum-by-producing type, was carried out while using the electrodialyzer having the above-mentioned three dialyzing chambers per one unit according to the present invention. The removal of $Cl^-$ could be effected at an extremely high efficiency.

Namely, according to the present invention, (1) only $Cl^-$ can be effectively removed from the liquid of high in concentration of $SO_4^{2-}$, without being accompanied by the scale trouble of gypsum and without being limited by the kinds and the amount of cations which are dissolved in the liquid saturated with gypsum, (2) since, in the method of the present invention, gypsum is scarcely deposited, the removal of $Cl^-$ according to the present invention can be operated at a high current density as compared to the conventional method wherein the current density could not be raised, because gypsum was apt to be deposited by raising the current density in the operation of electrodialysis, (3) since the pH of the $SO_2$-absorbing liquid is not limited, the addition of any chemical for adjusting the pH is not necessary and (4) since the organc substances present as anion in the $SO_2$-absorbing liquid scarcely shift into the concentrated liquid of $Cl^-$, the treatment of the waste liquor of the process is easily carried out.

What is claimed is:

1. A method for treating a liquid used for absorbing gaseous sulfur dioxide in the wet process for desulfurization of a combustion exhaust gas of the gypsum-by-producing type so as to remove chloride ions from said liquid wherein said liquid has been saturated with gypsum, has dissolved at least magneisium sulfate and magneisium chloride and has been used for absorbing gaseous sulfur dioxide, the method comprising the steps of conducting a clarification treatment and afterward passing said liquid through an electrodialyzer having three dialyzing chambers which comprise one sheet of cation-exchange membrane and two sheets of membrane selectively permeable to monovalent anions as one unit, and thereby selectively separating and removing chloride ions fom said liquid as an aqueous solution of magnesium chloride of a high concentration.

2. A method according to claim 1, wherein each unit of said three dialyzing chambers comprises (1) an intermediate chamber located between said two sheets of membrane ($A_1$ and $A_2$) selectively permeable to monovalent anions, (2) a concentrating chamber located between said membrane ($A_2$) selectively permeable to monovalent anions and said cation-exchange membrane and (3) a desalting chamber located beween said cation-exchange membrane and a sheet of membran ($A_1$) selectively permeable to monovalent anions of the neighboring unit of three dialyzing chambers, said method comprising the steps of passing said liquid, which has been saturated with gypsum and has been clarified, through said desalting chamber, thereby desalting said liquid and at the same time, removing an aqueous solution of magnesium chloride of a high concentration, which is formed in said concentrating chamber, therefrom.

3. A method according to claim 2, wherein said intermediate chamber is supplied with an aqueous solution containing chloride ions, thereby retaining the concentration of sulfate ions (equivalent/liter) so as to be not over the concentration of chloride ions (equivalent/liter) in said intermediate chamber.

4. A method according to claim 3, wherein said supply aqueous solution is a liquid which has been prepared by diluting the concentrated liquid of magnesium chloride discharged from said concentrating chamber with water.

5. A method according to claim 4, wherein from 3 to 8% by weight of said concentrated liquid of magnesium chloride discharged from said concentrating chamber is used for said supply aqueous solution.

6. A method according to claim 2, wherein the liquid which has been subjected to desalting treatment in said desalting chamber is recycled to the system of said process for desulfurization.

7. A method according to claim 2, wherein a liquid discharged from said intermediate chamber is introduced into said desalting chamber.

8. A method according to claim 1, wherein said liquid saturated with gypsum contains a magnesium salt of a carboxylic acid.

9. A method according to claim 8, wherein said carboxylic acid is sulfosuccinic acid or adipic acid.

* * * * *